(12) United States Patent
Ichnowski et al.

(10) Patent No.: US 11,334,085 B2
(45) Date of Patent: May 17, 2022

(54) METHOD TO OPTIMIZE ROBOT MOTION PLANNING USING DEEP LEARNING

(71) Applicant: The Regents of the University of California, Oakland, CA (US)

(72) Inventors: Jeffrey Ichnowski, Chapel Hill, NC (US); Kenneth Yigael Goldberg, Berkeley, CA (US); Yahav Avigal, Albany, CA (US); Vishal Satish, Cupertino, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/328,957

(22) Filed: May 24, 2021

(65) Prior Publication Data

US 2021/0365032 A1    Nov. 25, 2021

Related U.S. Application Data

(60) Provisional application No. 63/028,993, filed on May 22, 2020.

(51) Int. Cl.
*G06F 17/00* (2019.01)
*G05D 1/02* (2020.01)
(Continued)

(52) U.S. Cl.
CPC ......... *G05D 1/0221* (2013.01); *G05B 13/027* (2013.01); *G06N 3/0454* (2013.01)

(58) Field of Classification Search
CPC ... G05D 1/0221; G05B 13/027; G06N 3/0454
(Continued)

(56) References Cited

U.S. PATENT DOCUMENTS

| 4,990,838 A * | 2/1991 | Kawato | B25J 9/161 |
| | | | 700/246 |
| 8,204,623 B1 * | 6/2012 | Bhattacharyya | B25J 9/1666 |
| | | | 700/245 |

(Continued)

OTHER PUBLICATIONS

Ross, S. et al., "A Reduction of Imitation Learning and Structured Prediction to No. Regret Online Learning," Proceedings of the Fourteenth International Conference on Artificial Intelligence and Statistics, Apr. 11, 2011. Fort Lauderdale, Florida, 9 pages.
(Continued)

*Primary Examiner* — Ronnie M Mancho
(74) *Attorney, Agent, or Firm* — McCoy Russell LLP

(57) ABSTRACT

Methods and systems are provided for high-speed constrained motion planning. In one embodiment, a method includes computing, with a neural network trained on trajectories generated by a non-convex optimizer, a trajectory from one or more initial states of an autonomous system to one or more final states of the autonomous system, updating, with the non-convex optimizer, the trajectory according to kinematic limits and dynamic limits of the autonomous system to obtain a final trajectory, and automatically controlling the autonomous system from an initial state of the one or more initial states to a final state of the one or more final states according to the final trajectory. In this way, efficient and smooth trajectories can be rapidly computed for effective real-time control while accounting for obstacles and physical constraints of an autonomous system.

18 Claims, 8 Drawing Sheets

(51) Int. Cl.
  *G06N 3/04* (2006.01)
  *G05B 13/02* (2006.01)
(58) Field of Classification Search
  USPC .......................................................... 700/250
  See application file for complete search history.

(56) References Cited

U.S. PATENT DOCUMENTS

| | | | | |
|---|---|---|---|---|
| 10,281,897 | B2* | 5/2019 | Di Cairano | G05B 13/048 |
| 2005/0162515 | A1* | 7/2005 | Venetianer | G06T 7/20 |
| | | | | 348/143 |
| 2015/0127155 | A1* | 5/2015 | Passot | B25J 9/161 |
| | | | | 700/257 |
| 2016/0147203 | A1* | 5/2016 | Di Cairano | G05B 13/042 |
| | | | | 700/30 |
| 2019/0184561 | A1* | 6/2019 | Yip | B25J 9/161 |
| 2020/0276698 | A1* | 9/2020 | Ding | B25J 9/163 |
| 2020/0293009 | A1* | 9/2020 | Quirynen | G05B 13/048 |
| 2020/0363801 | A1* | 11/2020 | He | G05D 1/0212 |
| 2020/0363814 | A1* | 11/2020 | He | G05D 1/0217 |
| 2021/0053230 | A1* | 2/2021 | Mizoguchi | B25J 9/1612 |
| 2021/0124321 | A1* | 4/2021 | Benosman | G06F 17/13 |
| 2021/0129334 | A1* | 5/2021 | Kanunikov | B25J 9/1671 |

OTHER PUBLICATIONS

Zeiler, M., "ADADELTA: An Adaptive Learning Rate Method," arXiv Cornell University Website, Available Online at https://arxiv.org/abs/1212.5701, Dec. 22, 2012, 6 pages.

Schulman, J. et al., "Finding Locally Optimal, Collision-Free Trajectories with Sequential Convex Optimization," Robotics: Science and Systems, vol. 9, Jun. 2013, 10 pages.

He, K. et al., "Delving Deep into Rectifiers: Surpassing Human-Level Performance on ImageNet Classification," Proceedings of the 2015 IEEE International Conference on Computer Vision, Dec. 7, 2015, Santiago, Chile, 9 pages.

Mahler, J. et al., "Learning ambidextrous robot grasping policies," Science Robotics, vol. 4, No. 26, Jan. 16, 2019, 12 pages.

Stellato, B. et al., "OSQP: an Operator Splitting Solver for Quadratic Programs," arXiv Cornell University Website, Available Online at https://arxiv.org/abs/1711.08013, Nov. 21, 2017, Revised Feb. 12, 2020, 39 pages.

Ichnowski, J. et al., "GOMP: Grasp-Optimized Motion Planning for Bin Picking," Proceedings of the 2020 International Conference on Robotics and Automation (ICRA), May 31, 2020, Paris, France, 8 pages.

* cited by examiner

METHOD TO OPTIMIZE ROBOT MOTION PLANNING USING DEEP LEARNING

CROSS-REFERENCE TO RELATED APPLICATIONS

The present application claims priority to U.S. Provisional Application No. 63/028,993 entitled "DEEP LEARNING TO WARM START GRASP-OPTIMIZED MOTION PLANNING", and filed on May 22, 2020. The entire contents of the above-listed application is hereby incorporated by reference for all purposes.

FIELD

The present description relates generally to motion planning for autonomous systems, and in particular to using deep learning for fast computation of constrained and smooth motion trajectories.

BACKGROUND

Autonomous systems, such as robots and vehicles, are systems configured to move independent of human input. Motion planning is a process of determining how an autonomous system should maneuver through their environment. Motion planning involves computing a trajectory from a starting state of the autonomous system to a desired final state. For example, motion planning may enable a robot to move a robotic arm to reach a desired object, or to enable an autonomous vehicle to travel to a desired destination without human control. One objective of motion planning for an autonomous system is to plan trajectories for the autonomous system that avoid collisions with obstacles.

SUMMARY

Current approaches to motion planning for autonomous systems use input from sensors, for example, to identify the position of obstacles relative to the autonomous system. The motion planner then plans trajectories to reach desired final states while avoiding collisions with these obstacles. Such approaches to motion planning further consider additional objectives such as minimizing the amount of time, finding the shortest path from the starting state to the desired state, and meeting additional constraints such as remaining within the kinematic limitations of the system. However, existing motion planning algorithms are typically computationally expensive when taking all constraints into account. Such approaches become even more computationally expensive and time consuming as additional degrees of freedom in the motion of an autonomous system are introduced. As a result, tradeoffs in accuracy may be considered in order to reduce the computation time, such that motion planning may be executed with minimal delay for practical applications.

To achieve motion planning with minimal delay for practical applications, where the computation time is significantly shorter than the reduction in travel time, while satisfying a plurality of constraints on the autonomous system as well as its surrounding environment, systems and methods are provided for fast computation of constrained and smooth motion trajectories. An example method for fast motion planning includes computing, with a neural network trained on trajectories generated by a non-convex optimizer, a trajectory from one or more initial states of an autonomous system to one or more final states of the autonomous system, updating, with the non-convex optimizer, the predicted trajectory according to kinematic limits and dynamic limits of the autonomous system to obtain a final trajectory, and automatically controlling the autonomous system from an initial state of the one or more initial states to a final state of the one or more final states according to the final trajectory. In this way, motion trajectories may be rapidly computed that avoid obstacles, move swiftly, and meet additional constraints such as reducing jerk to produce smooth motions that reduce wear on the system and payload inertia.

It should be understood that the brief description above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
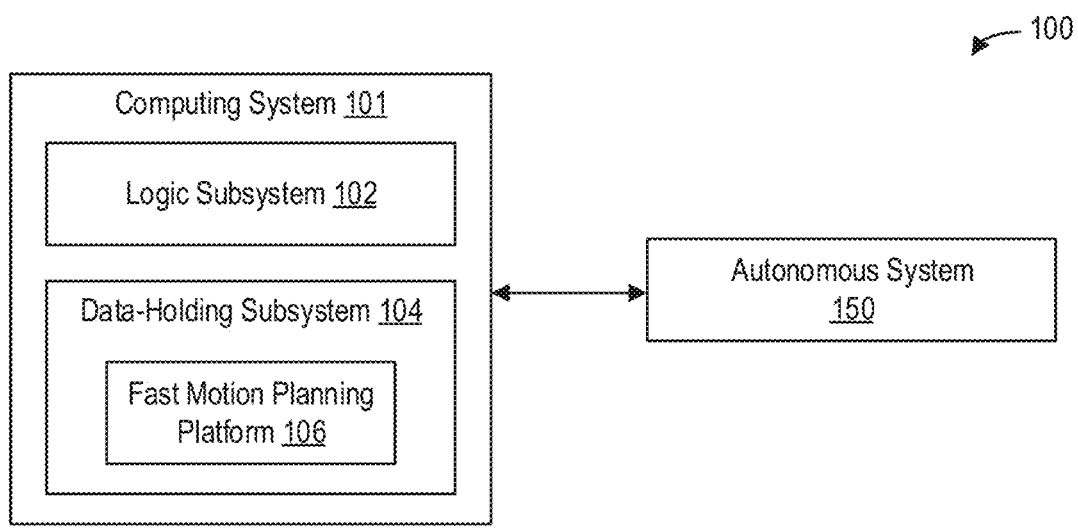
FIG. 1 shows a block diagram illustrating an example computing system for grasp-optimized motion planning, according to an embodiment.

The following description relates to constrained motion planning for autonomous systems. For many automated systems such as robots, cranes, and vehicles, it is desirable to compute motion trajectories that avoid obstacles, move swiftly, and meet additional constraints such as reducing jerk to produce smooth motions that reduce wear on the system and avoid excessive forces on the payload. Given as input the associated obstacles and constraints, one or more initial configurations of the system, and one or more desired final configurations for the system, a complex nonlinear function characterizes the desired motion trajectory that meets the criteria. For many applications where the initial and final system configurations vary, for example robot motions packing boxes in an e-commerce warehouse, computing this function is time consuming and thus has been impractical for applications where speed is important. Recent advances in deep learning enable artificial neural networks to learn and rapidly compute complex functions from examples. As the functional output of the artificial neural network is not exact but close to the desired motion trajectory, this output can optionally be fine-tuned by subsequent computation. This approach has been recently shown to reduce computation time by two orders of magnitude, making constrained motion planning practical for a broad range of industrial applications.

The present disclosure provides methods and systems for rapidly computing motion trajectories for automated systems such as robots, cranes, and vehicles. Given as input the associated obstacles and constraints, one or more initial configurations of the system, and one or more desired final configurations for the system, the method starts with a novel but slow iterative procedure to compute example motion trajectories that are fast and meet all criteria. Each iteration of this slow procedure improves the trajectory, e.g., making it faster or smoother, until it satisfies all criteria to desired tolerances. Offline (prior to execution), this slow procedure is used to generate thousands of examples of input conditions and output motion trajectories. These examples are then used to train neural networks that can rapidly compute motion trajectories for novel inputs. The resulting motion trajectories can optionally be fine-tuned by future computation.

In one embodiment of the present disclosure, the systems and methods provided herein can be used to speed and improve the motion of a robot packing products from bins to boxes in an e-commerce warehouse. In this case the set of initial configurations is defined by a desired placement of a suction cup held by the robot onto the object: the orientation of the robot wrist can be any angle about the primary axis of the suction cup. The set of final configurations is defined by a position of the suction cup above the packing box such that when suction is activated, the object is dropped into the box. There is freedom in the precise position and orientation of the final configuration. Obstacles in the environment are defined by the position of the bin and box. To increase system throughput and reduce wear on the robot, it is desirable to rapidly compute a motion trajectory from one of the initial configurations to one of the final configurations that avoids obstacles and is fast and smooth.

The systems and methods of the present disclosure include a slow (e.g., on the order of tens of seconds) method for computing motion trajectories and a fast (e.g., on the order of tens of milliseconds) method for computing motion trajectories based on learning from examples generated by the slow method. By reducing computation time by two orders of magnitude over, for example, from 25 seconds to 80 milliseconds, the systems and methods provided herein make autonomous motion planning practical for real-time use in e-commerce warehouses.

A Grasp-Optimized Motion Planner (GOMP), for example, can compute a time-optimized motion plan subject to joint velocity and acceleration limits and, consequently, allows for degrees of freedom in the pick and place frames. The motions that GOMP is capable of producing are fast and smooth. However, by not taking into account the motion's jerk or change in acceleration, the robot arm will often rapidly accelerate at the beginning of each motion and rapidly decelerate at the end. In the context of continuous pick-and-place operations in a warehouse, these high-jerk motions could result in wear on the robot's motors and reduce the overall service life of a robot. With the introduction of jerk limits, the resulting sequential quadratic program (SQP) and its underlying quadratic program (QP) may require computation on the order of tens of seconds which is not practical for speeding up the overall pick-and-place pipeline. Systems and methods are provided herein for a Deep Jerk and Grasp-Optimized Motion Planner (DJ-GOMP) which uses a deep neural network to learn trajectories that warm start computation, and may advantageously yield a reduction in computation times from 25.7 seconds to 80 milliseconds, making it practical for industrial use.

Turning now to the figures, FIG. 1 shows a block diagram illustrating an example computing system 100 for deep jerk and grasp-optimized motion planning, according to an embodiment. The computing system 100 comprises a computing system 101 communicatively coupled to an autonomous system 150, such as a robot or another system adapted for autonomous motion. Although the computing system 101 is depicted as a separate system from the autonomous system 150, it should be appreciated that in some examples, one or more components of the computing system 101 may be integrated into the autonomous system 150.

The computing system 101 comprises a logic subsystem 102 and a data-holding subsystem 104. In some examples, the computing system 101 may optionally include one or more of a communication subsystem, a display subsystem, and a user interface subsystem.

The logic subsystem 102 may include one or more physical devices configured to execute one or more instructions. For example, the logic subsystem 102 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 102 may include one or more processors that are configured to execute software instructions. In some examples, the logic subsystem 102 may include one or more hardware and/or firmware logic machines configured to execute hardware and/or firmware instructions. Processors of the logic subsystem 102 may be single core or multi-core, and the programs executed thereon may be configured for parallel or distributed processing. The processors of the logic subsystem 102 may comprise one or more graphics processing units (GPUs), one or more tensor processing units (TPUs), one or more field-programmable gate arrays (FPGAs), combinations thereof, and other processing devices capable of massive parallel computation. The logic subsystem 102 may optionally include individual components that are distributed throughout two or more devices, which may be remotely located and/or configured for coordinated processing. One or more aspects of the logic subsystem 102 may be virtualized and executed by remotely-accessible networked computing devices configured in a cloud computing configuration.

The data-holding subsystem 104 may include one or more physical, non-transitory devices configured to hold data and/or instructions executable by the logic subsystem 102 to implement the herein-described methods and processes. When such methods and processes are implemented, the state of data-holding subsystem may be transformed (for example, to hold different data).

The data-holding subsystem 104 may include removable media and/or built-in devices. Data-holding subsystem 104 may include optical memory (for example, CD, DVD, HD-DVD, Blu-Ray Disc, and so on), and/or magnetic memory devices (for example, hard disk drive, floppy disk drive, tape drive, MRAM, and so on), and the like. In general, the data-holding subsystem 104 may include, as illustrative and non-limiting examples, one or more of random-access memory (RAM), read-only memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. The data-holding subsystem 104 may include devices with one or more of the following characteristics: volatile, nonvolatile, dynamic, static, read/write, read-only, random access, sequential access, location addressable, file addressable, and content addressable. In some embodiments, the logic subsystem 102 and the data-holding subsystem 104 may be integrated into one or more common devices, such as an application specific integrated circuit or a system on a chip. In other embodiments, the data-holding subsystem 104 may include individual components that are distributed throughout two or more devices, which may be remotely located and accessible through a networked configuration.

When included, a communication subsystem (not depicted) may be configured to communicatively couple the computing system 101 with one or more other computing devices, including but not limited to the autonomous system 150. The communication subsystem may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, and so on. In some examples, the communications subsystem may enable the computing system 101 to send and/or receive messages to and/or from other computing systems via a network such as the public Internet.

As described further herein, the computing system 101 provides a deep jerk and grasp-optimized motion planner (DJ-GOMP) for rapidly generating motion trajectories for the autonomous system 150. To that end, the data-holding subsystem 104 may store a fast motion planning platform 106 configured to generate motion trajectories for the autonomous system 150. An example fast motion planning platform 106 is described further herein with regard to FIG. 2. The fast motion planning platform 106 may comprise a DJ-GOMP as described herein.

The autonomous system 150 may comprise a robot such as a robotic arm, an autonomous vehicle, a crane, or any other physical system configured for autonomous (i.e., not human-driven) motion that is non-repetitive (i.e., where motion of the autonomous system 150 is not pre-determined according to fixed or known trajectories), where the motion is in response to sensed information, such as for example from the surrounding environment. As an illustrative example, the autonomous system 150 may comprise a robot for picking in a warehouse, where the robot grasps an object at an initial position (e.g., a "pick" position) and moves the object to a final position (e.g., a "place" position).

For a given environment, including but not limited to a workcell environment or environments for autonomous systems, DJ-GOMP may speed up motion planning for a robot and repeated tasks through a three-phase process. In such embodiments, the first phase randomly samples tasks from the distribution of tasks the robot is likely to encounter and generates a time-optimized jerk-minimized motion plan using an SQP. The second phase trains a deep neural network using the data from the first phase to compute time-optimized motion plans for a given task specification. The third phase, used in pick-and-place, uses the deep neural network from the second phase to generate a motion plan to warm start the SQP from the first phase. By warm starting the SQP from the deep neural network's output, the DJ-GOMP ensures that the motion plan meets the constraints of the robot (e.g., something the neural network cannot guarantee), and greatly accelerates the convergence rate of the SQP (e.g., something the SQP cannot do without a good initial approximation).

In considering the problem of automating grasping and placing motions of a manipulator arm motions while avoiding obstacles and minimizing jerk and time, minimizing motion time requires incorporating the robot's velocity and acceleration limits. This may be cast as an optimization problem with non-convex constraints and compute an approximation using a sequential quadratic program (SQP).

To plan a robot's motion, a trajectory $\tau$ may be computed as a sequence of configurations $(q_0, q_1, \ldots, q_n)$, in which each configuration $q_i$ is the complete specification of the robot's degrees of freedom. Of the set of all configurations C, the robot is in collision with one or more obstacles for a portion $C_{obs} \subseteq C$. The remainder $C_{free} = C \backslash C_{obs}$ is the free space. For the motion to be valid, each configuration must be in the free space $q \in C_{free}$ and within the joint limits $[q_{min}, q_{max}]$.

The motion starts with the robot's end effector at a grasp frame $g_0 \in SE(3)$ and ends at a place frame $g_H \in SE(3)$, where SE(3) is the Special Euclidean group in three dimensions. In this way, the grasp frame and the place frames specify translational and rotational configurations in three dimensions. Grasps for parallel-jaw grippers have an implied degree of freedom about the axis defined by the grasp contact points. Similarly, suction-cup grippers have an implied degree of freedom about the contact normal. The implied degrees of freedom means that the start of the motion is constrained to a set:

$$G_0 = \{g_i | g_i = R_c(\theta) g_0 + t, \theta \in [\theta_{min}, \theta_{max}], t \in [t_{min}, t_{max}]\},$$

where $R_c(\cdot)$ is a rotation about the free axis c, $\theta_{min}$ and $\theta_{max}$ bound the angle of rotation, and $t_{min} \in \mathbb{R}^3$ and $t_{max} \in \mathbb{R}^3$ bound the translation. The place frame may have similar degrees of freedom. The place frame or final frame $g_H$ may be similarly formulated but include different degrees of freedom based on, as an illustrative and non-limiting example, packing requirements. To be dynamically feasible, trajectory also remains within the velocity, acceleration, and jerk limits ($v_{max}$, $a_{max}$, and $j_{max}$) of the robot.

Treating the trajectory is $\tau: \mathbb{R} \to C$ as a function of time, and defining a function $h: \mathcal{T} \to \mathbb{R}$ as the duration of the trajectory, the objective of DJ-GOMP is to compute:

$$\underset{\tau}{\text{argmin}}\ h(\tau),$$

such that:

$$\tau(t) \in [q_{min}, q_{max}] \cup C_{free} \forall t \in [0, h(\tau)],$$

$$\frac{d\tau}{dt}(t) \in [-v_{max}, v_{max}] \forall t \in [0, h(\tau)],$$

$$\frac{d^2\tau}{dt}(t) \in [-a_{max}, a_{max}] \forall t \in [0, h(\tau)],$$

$$\frac{d^3\tau}{dt}(t) \in [-j_{max}, j_{max}] \forall t \in [0, h(\tau)],$$

$$p(\tau(0)) \in G_0,$$

$$p(\tau(h(\tau))) \in G_H.$$

where $p: C \to SE(3)$ is the robot's forward kinetic function to gripper frame. In this context, "frame" means a fixed rotation and translation in three dimensions, while "forward kinematics" computes the frame of the gripper based on the joint configuration. Additionally, should multiple trajectories satisfy the above minimization, DJ-GOMP computes a trajectory that minimizes sum-of-squared jerks over time.

Embodiments may include a multi-step process for computing motion plans quickly. The fast motion planning platform 106 may be based on a sequential quadratic program (SQP) proposed in GOMP which is a time-optimizing extension of a trajectory optimizer that incorporates a depth map for obstacle avoidance, degrees of freedom and pick-and-place points, and robot dynamic limits. As described herein, the SQP in GOMP may be extended to include jerk limits and minimization to create J-GOMP, a jerk-limited motion planner. J-GOMP produces jerk-limited motion plans, but at a substantially increased compute time. Quadratic programs (QPs) have a quadratic objective (linear and squared terms) and linear constraints. An SQP solves non-convex problems involving a quadratic objective and non-convex constraints, for example by using a sequence of QPs. As referred to herein, an SQP comprises a software module configured to solve such non-convex problems with a quadratic objective and non-convex constraints.

To address slow computation, a deep neural network may be trained to approximate J-GOMP. Because the neural network approximates J-GOMP, J-GOMP may be used to generate a training dataset consisting of trajectories for random pick-and-place points likely to be encountered at runtime (e.g., from location in a picking bin, to a location in a placement bin). With GPU-based acceleration, the neural network can compute approximate trajectories in a few milliseconds. However, the neural network cannot guarantee that trajectories it generates will be kinematically or dynamically feasible or avoid obstacles.

To fix the trajectories generated by the neural network, the neural network's trajectory may be used to warm start the SQP from J-GOMP. The warm start allows the SQP to start from a trajectory much closer to the final solution and thus allow it to converge quickly to an optimal solution. Since the SQP enforces the kinematic, dynamic, and obstacle constraints, the resulting trajectory is valid.

Figure 2:
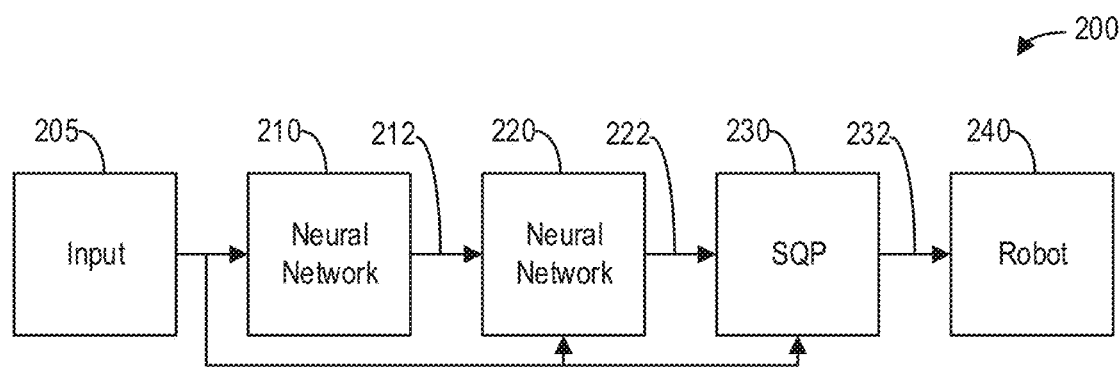
FIG. 2 shows a block diagram illustrating an example fast motion planning pipeline, according to an embodiment.

FIG. 2 shows a block diagram illustrating an example fast motion planning pipeline 200, according to an embodiment. The fast motion planning pipeline 200 is configured to rapidly generate, for a given input 205, an optimized motion plan or trajectory for controlling the motion of a robot 240 or other autonomous system. To that end, the fast motion planning pipeline 200 includes three phases between the input 205 and the robot 240. The first phase comprises a neural network 210 configured to estimate the trajectory horizon (H*) 212 for the input 205. The term "horizon" as used herein refers to a number of waypoints for the trajectory, and thus relates to the temporal and/or spatial duration of the trajectory. Thus, the neural network 210 estimates a desired number of waypoints between the initial and final frames of the input 205. The second phase comprises a neural network 220 configured to estimate an initial trajectory ($x^{(O)}$) 222 for the trajectory horizon 212 and the input 205. The third phase comprises an SQP 230 configured to optimize the initial trajectory 222 for the input 205, in particular to ensure that the optimized trajectory ($x^{(k)}$) 232 meets all joint kinematic and dynamic limits so that the optimized trajectory 232 may be successfully executed by the robot 240. Although FIG. 2 depicts an SQP 230, it should be appreciated that the fast motion planning pipeline 200 may be implemented with a non-convex optimizer other than a sequential quadratic program without departing from the scope of the present disclosure.

Figure 3:
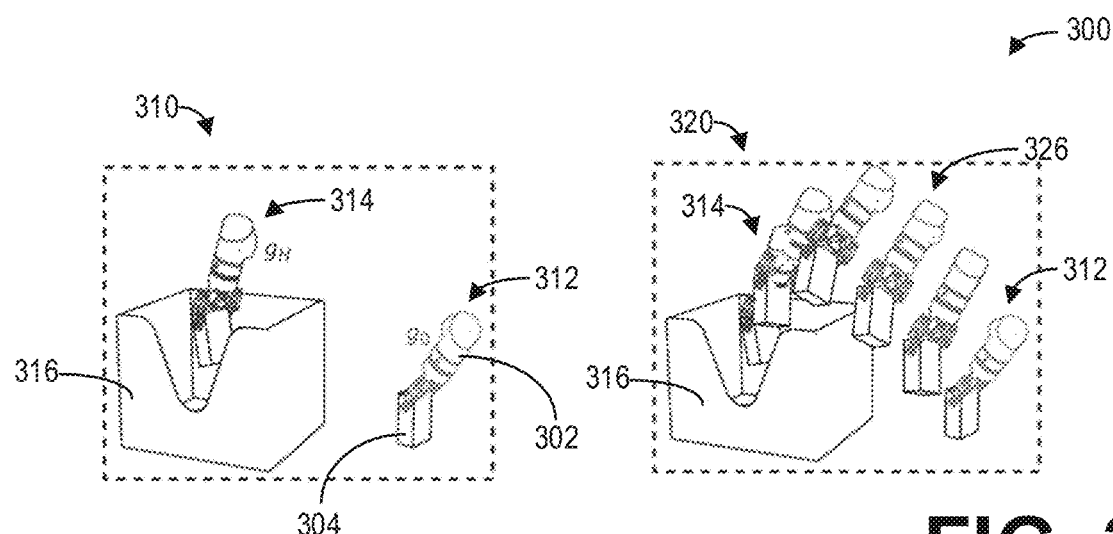
FIG. 3 shows a set of images illustrating an example motion planning trajectory between an initial grasp frame and a final grasp frame, according to an embodiment.

The input 205 may comprise an initial frame and a final frame, wherein the initial frame $g_0$ specifies an initial position or initial configuration of the autonomous system while the final frame $g_H$ specifies a final position or final configuration of the autonomous system. As an illustrative and non-limiting example, FIG. 3 shows a set of images 300 illustrating an example motion planning trajectory 326 between an initial grasp frame 312 for a robotic arm 302 grasping an object 304 and a final grasp frame 314 of the robotic arm 302, according to an embodiment. Given the initial grasp frame 312 and the final grasp frame 314 as shown in the first image 310, the fast motion planning pipeline 200 determines the trajectory 326 of the robotic arm 302 grasping the object 304, as shown in the second image 320, such that the robotic arm 302 and the object 304 do not collide with any obstacles, such as the obstacle 316.

Referring again to FIG. 2, the neural network 210 may comprise a classification neural network with two fully-connected layers with one-hot encoding trained using a cross-entropy loss. Given the input 205, the neural network 210 outputs a trajectory horizon 212. To that end, the trajectory horizon 212 may be computed using a single forward pass of the input 205 through the neural network 210. In some examples, the neural network 210 and the neural network 220 may comprise a same neural network. The trajectory horizon 212 may thus be obtained by computing a forward pass of the neural network 210 with the input 205.

The neural network 210 comprises a classification network trained to identify the optimal trajectory duration from the same training data as the trajectory network (i.e., the neural network 220). When generating a trajectory for training the neural networks 210 and 220 for a given pair of initial and final states, a trajectory is generated for each of a plurality of trajectory lengths, starting at the maximum trajectory length, and stopping when the constraints cannot be satisfied. As an illustrative and non-limiting example, forty-four trajectories between the initial and final state are generated, each with a different number of waypoints (also referred to herein as a horizon or duration of the trajectory). The trajectory with the shortest duration is used as the value for training the classification neural network 210. The trajectories that satisfy all constraints are used to train the trajectory neural network 220. For example, if the fastest trajectory that satisfies all constraints is at a horizon of 27, then the classification neural network 210 is trained with the trajectory with horizon of 27, and the trajectory neural network 220 is trained with trajectories of duration 27, 28, 29, . . . , 60, as an illustrative and non-limiting example. In this way, if the trajectory neural network 220 outputs forty-four trajectories with different horizons, the classification neural network 210 outputs a value for each of the forty-four horizons corresponding to the forty-four trajectories. The highest value (i.e., the one-hot value) estimates which of the forty-four trajectories is the fastest trajectory that satisfied all constraints. If the estimated value is too short, that means the trajectory would not be able to satisfy all constraints within the duration allotted. If the estimated value is too long, the trajectory will be suboptimal.

The neural network 220 treats the trajectory optimization process as a function $f_\tau$ to approximate:

$$f_\tau : SE(3) \times SE(3) \to \mathbb{R}^{H^* \times n \times 4},$$

where the arguments to the function are the initial and final frames (e.g., pick and place frames), and the output is a discretized trajectory of variable length H* waypoints, each of which has a configuration q, velocity v, acceleration a, and jerk j for all n joints of the robot. As the neural network 220 may only approximate the function $f_\tau$, the neural network 220 may be expressed as:

$$\tilde{f}_\tau(\cdot) = f_\tau(\cdot) + E(\tau),$$

where $E(\tau)$ comprises an unknown error distribution. Consequently, the output of the neural network 220 may not be dynamically or kinetically feasible. Therefore, rather than use the output of the neural network 220 to directly control motion trajectories of autonomous systems, the output of the neural network 220 may be used to warm start or initialize the SQP 230 as discussed further herein.

To generate a jerk-minimized time-optimized trajectory, the SQP 230 starts with a discretized estimate of the trajectory $\tau$ as a sequence of H waypoints after the starting configuration, in which each waypoint represents the system configuration q, velocity v, and acceleration a at a moment in time. The waypoints are sequentially separated by $t_{step}$ seconds. This discretization is collected into an initial estimated trajectory $x^{(0)}$, where the superscript represents a refinement iteration. Thus, the initial estimated trajectory may be expressed as $$x^{(0)} = (x_0^{(0)}, x_1^{(0)}, \ldots, x_H^{(0)}),$$

where at each time t, $$x_t^{(k)} = \begin{bmatrix} q_t^{(k)} \\ v_t^{(k)} \\ a_t^{(k)} \\ j_t^{(k)} \end{bmatrix}.$$

It should be appreciated that in some examples, the optimization may be formulated without explicit reference to the jerk at each waypoint, as it may be sufficient to approximate jerk as the change in acceleration over time between waypoints. The choice of the number of waypoints H and the time step $t_{step}$ is application specific, though it should be appreciated that in physical implementations, the time step $t_{step}$ may be selected to match the control frequency of the robot (or an integer multiple thereof), and the number of waypoints H may be selected such that the product of the number of waypoints H and the time step $t_{step}$ is an estimate of the upper bound of the minimum trajectory time for the workspace and task input distribution.

The initial value of $x^{(0)}$ seeds or warm starts the SQP computation. Without the approximation generated by the neural network, this trajectory may be initialized to all zeroes. In practice, the SQP can converge faster by setting $x^{(0)}$ to a linear or spline interpolation between inverse-kinematic solutions to $g_0$ and $g_H$.

In each iteration k=(0, 1, 2, . . . , m) of the SQP, DJ-GOMP linearizes the non-convex constraints of obstacles, pick locations, and place locations, and solves a quadratic program:

$$x^{(k+1)} = \underset{x}{\operatorname{argmin}} \frac{1}{2} x^T P x + p^T x,$$

such that $Ax \leq b$, where the matrix A defines constraints enforcing the trust region, joint limits, and dynamics, and the matrix P is defined such that $x^T P x$ is a sum-of-squared jerks. It should be appreciated that other criteria may be optimized, such as sum-of-squared velocities, sum-of-squared accelerations, and so on. To enforce the linearized non-convex constraints, DJ-GOMP adds constrained nonnegative slack variables penalized using appropriate coefficients in p. As DJ-GOMP iterates over the SQP, it increases the penalty term exponentially, terminating on the iteration m at which $x^{(m)}$ meets the non-convex constraints.

The SQP 230 generates a motion plan given an initial guess $x^{(0)}$ of the trajectory, where (h+1) is the number of waypoints in the initial guess $x^{(0)}$, the time step $t_{step}$ is the time between each waypoint, $g_0$ and $g_H$ are the initial and final frames, a shrink factor $\beta_{shrink}$ is in the set (0,1), a grow factor $\beta_{grow}$ is greater than one, and a parameter $\gamma$ is greater than one. A first algorithm executed by the SQP 230 to generate the motion plan includes initializing an initial penalty multiple $\mu$, an initial trust region size $\in_{trust}$, and sets the iteration count k to zero. The SQP 230 then linearizes $x^{(0)}$ as a quadratic program (QP) to obtain initial values of P, p, A, and b. Then, while $\mu < \mu_{max}$, the SQP 230 solves the quadratic program:

$$x^{(k+1)} = \underset{x}{\operatorname{argmin}} \frac{1}{2} x^T P x + p^T x,$$

where using the initial guess $x^{(0)}$ for the first iteration provides a warm start for $x^{(k)}$. If there is a sufficient decrease in trajectory cost, then the SQP 230 accepts the trajectory by setting (k+1) to k, and grows the trust region by setting the trust region size $\in_{trust}$ to $\in_{trust} \beta_{grow}$. The SQP 230 further updates the linearization using $x^{(k)}$ to obtain updated values of A and b. If there is not a sufficient decrease in trajectory cost, then the SQP 230 shrinks the trust region size $\in_{trust}$ to $\in_{trust} \beta_{shrink}$, and updates the trust region bounds only in b. If the trust region size $\in_{trust}$ is less than a minimum trust size $\in_{min\_trust}$, then the SQP 230 increases the penalty $\mu$ to $\gamma \mu$, resets the trust region size $\in_{trust}$ to the initial trust region size, and updates the penalty vector p in the quadratic program to match the penalty $\mu$. The SQP 230 thus solves the quadratic program until the penalty $\mu$ reaches the maximum penalty $\mu_{max}$, at which point the SQP 230 returns the latest solution $x^{(k)}$.

To enforce joint limits and dynamic constraints, the first algorithm of the SQP 230 creates a matrix A and a vector b that enforce the following linear inequalities on joint limits:

$$q_{min} \leq q_t \leq q_{max},$$

$$-v_{max} \leq v_t \leq v_{max},$$

$$-a_{max} \leq a_t \leq a_{max},$$

$$-j_{max} \leq j_t \leq j_{max},$$

as well as the following dynamic constraints between variables:

$$q_{t+1} = q_t + t_{step} v_t + \tfrac{1}{2} t_{step}^2 a_t + \tfrac{1}{6} t_{step}^3 j_t,$$

$$v_{t+1} = v_t + t_{step} a_t + \tfrac{1}{2} t_{step}^2 j_t,$$

$$a_{t+1} = a_t + t_{step} j_t.$$

In addition, the first algorithm linearizes non-convex constraints by adding slack variables to implement $L_1$ penalties. Thus, for a non-convex constraint $g_j(x) \leq c$, the first algorithm adds the linearization $\bar{g}_j(x)$ as a constraint in the form:

$$\bar{g}_j(x) - \mu y_j^+ + \mu y_j^- \leq c,$$

where $\mu$ is the penalty, and the slack variables are constrained such that $y_j^+ \geq 0$ and $y_j^- \geq 0$.

In the quadratic program of the SQP 230, obstacle avoidance constraints are linearized on the basis of the waypoints of the current iteration's trajectory. To compute these constraints, a second algorithm of the SQP 230 evaluates the spline:

$$q_{spline}(s;t) = q_t + sv_t + \tfrac{1}{2}s^2 a_t + \tfrac{1}{6}s^3 j_t,$$

between each pair of waypoints ($x_t$, $x_{t+1}$) against a depth map of obstacles to find the time $s \in [0, t_{step})$ and corresponding configuration $\hat{q}_t$ that minimizes signed distance separation from any obstacle. It should be appreciated that the spline above is illustrative and non-limiting, and that other formulations of splines may be implemented, such as splines that do not include the jerk j variables, without departing from the scope of the present disclosure. In this evaluation, a negative signed distance means that the configuration is in collision. The second algorithm then uses this configuration $\hat{q}_t$ to compute a separating hyperplane in the form $$n^T q + d = 0.$$

Figure 8:
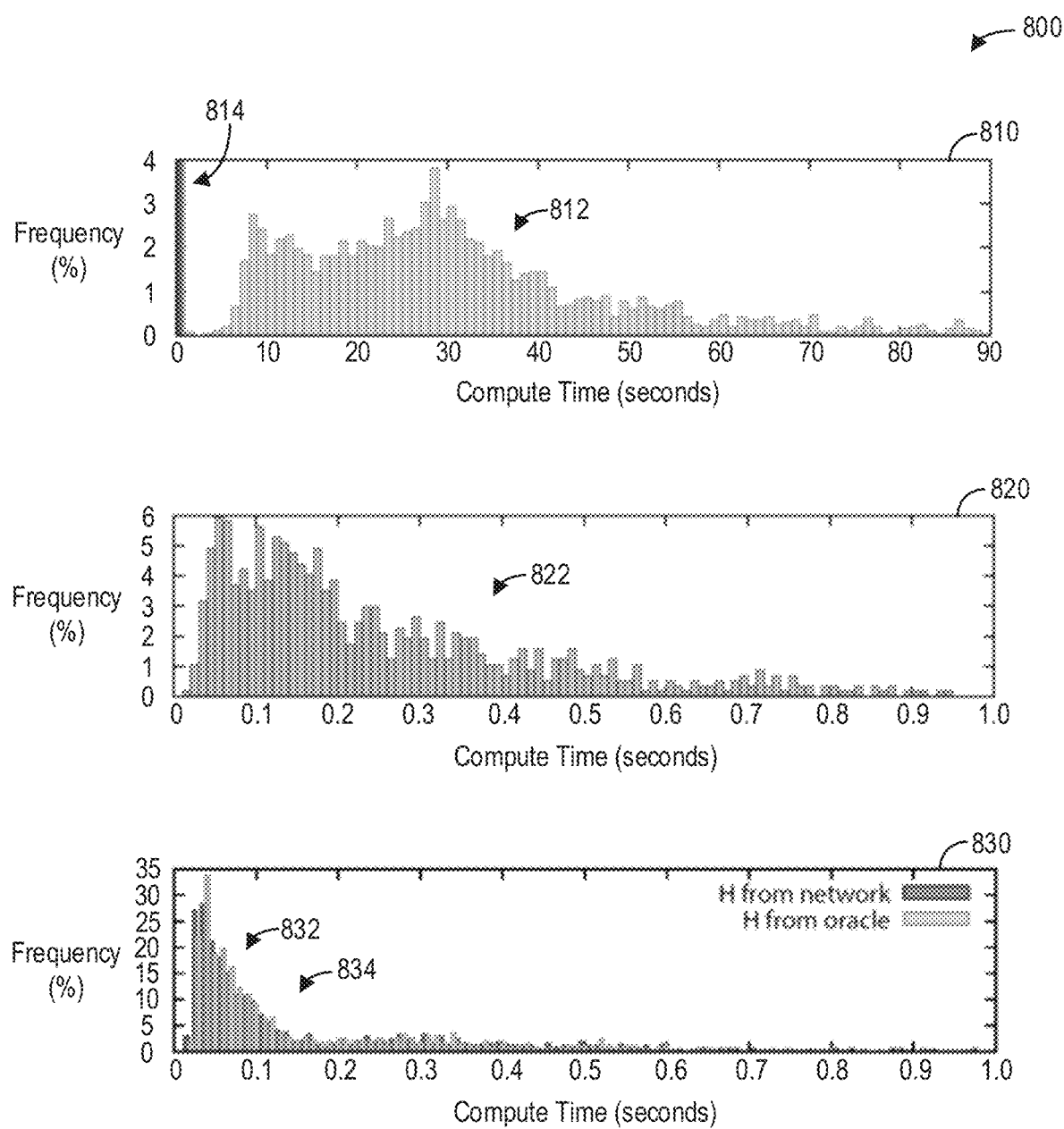
FIG. 8 shows a set of graphs illustrating example computation time distributions for a plurality of random motion plans obtained with different approaches, according to an embodiment.

The hyperplane is either the top plane of the obstacle it is penetrating or the plane that separates the configuration $\hat{q}_t$ from the nearest obstacle, as discussed herein with regard to FIG. 8. By selecting the top plane of the penetrated obstacle, this pushes the trajectory above the obstacle. By selecting the hyperplane of the nearest obstacle, the second algorithm keeps the trajectory from entering the obstacle. The linearize constraint for this point is:

$$n^T \hat{J}_t^{(k)} \hat{x}_t^{(k+1)} \geq -d - n^T p(\hat{x}_t^{(k)}) + n^T \hat{J}_t^{(k)} \hat{x}_t^{(k)},$$

where $\hat{J}_t$ is the Jacobian of the robot's position at the configuration $\hat{q}_t$. Because the configuration $\bar{q}_t$ and the Jacobian $\bar{J}_t$ are at an interpolated state between optimization variables at $x_t$ and $x_{t+1}$, this constraint is linearized by computing the chain rule for the Jacobian:

$$\hat{J}_t = J_p(\hat{q}_t) J_q(s),$$

where $J_p(\hat{q}_t)$ is the Jacobian of the position at the configuration $q_t$, and $J_q(S)$ is the Jacobian of the configuration on the spline at s:

$$J_q(s) = \begin{bmatrix} \frac{\partial p}{\partial q_t} \\ \frac{\partial p}{\partial q_{t+1}} \\ \frac{\partial p}{\partial v_t} \\ \frac{\partial p}{\partial v_{t+1}} \end{bmatrix}^T = \begin{bmatrix} -\frac{3s^2}{t^2} + \frac{2s^3}{t^3} + 1 \\ \frac{3s^2}{t^2} - \frac{2s^3}{t^3} \\ -\frac{2s^2}{t} + \frac{s^3}{t^3} + s \\ \frac{s^3}{t^2} - \frac{s^2}{t} \end{bmatrix}^T.$$

The linearization at each waypoint ensures that the robot will safely avoid obstacles with a sufficient buffer around obstacles (e.g., via a Minkowski difference with obstacles). However, slight variations in pick and place frames (i.e., initial and final frames) can shift the alignment of waypoints to obstacles. This shift of alignment may lead to solutions that vary disproportionately to small changes in input. Although this may be acceptable in operation, it may lead to data that can be difficult for a neural network to learn.

Thus, to linearize the obstacle-avoidance constraint, the SQP 230 executes a second algorithm. The second algorithm includes, for time t in the discrete range [0 . . . H), linearizing the obstacle nearest to $p(q_t)$ to obtain ($n_{min}$, $d_{min}$), and setting $q_t$ to $q_{min}$. The SQP 230 then performs a line search s to desired resolution, where for all s in the continuous range [0, $t_{step}$), the SQP 230 evaluates the spline:

$$q_s \leftarrow q_t + sv_t + \tfrac{1}{2}s^2 a_t + \tfrac{1}{6}s^3 j_t,$$

and linearizes the obstacle nearest to $p(q_s)$ to obtain ($n_s$, $d_s$). If SPQ 230 compares the signed distance and determines that $$n_s^T p(q_s) + d_s < n_{min}^T p(q_{min}) + d_{min},$$

then the SPQ 230 sets ($n_s$, $d_s$, $q_s$) to ($n_{min}$, $d_{min}$, $q_{min}$), the Jacobian of $q_s$ to $J_q$, the Jacobian of position at $q_{min}$ to $J_p$. The SPQ 230 then determines the position Jacobian $\hat{J}_t$ from the product of the Jacobians $J_p J_q$. The SPQ 230 then updates the lower bound with the slack $y_t^+$:

$$b_t \leftarrow -d_{min} - n_{min}^T p(q_{min}) + n_{min}^T \hat{J}_t x_t - \mu y_t^+.$$

The SPQ 230 then adds to the set of linear constraints in the quadratic program:

$$n_{min}^T \hat{J}_t x_t \geq b_t,$$

$$y_t^+ \geq 0.$$

In this way, the second algorithm of the SQP 230 ensures that obstacles are avoided in trajectories updated by the SQP 230.

Degrees of freedom in rotation and translation are also allowed to be added to initial and final grasp frames. This degree of freedom enables DJ-GOMP to take a potentially shorter path when an exact pose of an end effector of the robot, for example, is unnecessary. For example, as described further herein with regard to FIG. 6, a pick point with a parallel-jaw gripper can rotate about the axis defined by antipodal contact points, and the pick point with a suction gripper can rotate about the normal of its contact plane. Similarly, a task may allow for a place point anywhere within a bounded box. The degrees of freedom about the pick point can be optionally added as constraints that are linearized as:

$$w_{min} \leq J_0^{(k)} q_0^{(k+1)} - (g_0 - p(q_0^{(k)}) + J_0^{(k)} q_0^{(k)}) \leq w_{min},$$

where $q_0^{(k)}$ and $J_0^{(k)}$ are the configuration and Jacobian of the first waypoint in the accepted trajectory, $q_0^{(k+1)}$ is one of the variables the quadratic program is minimizing, and $w_{min} \leq w_{max}$ defines the twist allowed about the pick point. Applying a similar set of constraints to the final frame $g_H$ allows degrees of freedom in the place frame as well.

The SQP 230 establishes trust regions to constrain the optimized trajectory to be within a box with extents defined by a shrinking trust region size. Because convex constraints on dynamics enforce the relationship between configuration, velocity, and acceleration of each waypoint, the trust regions only need to be defined as box bounds around one of the three for each waypoint. As an illustrative and non-limiting example, the trust regions may be established on configurations.

The SQP 230 executes a third algorithm to generate a time-optimal motion plan. For the start and end frames $g_0$ and $g_H$, the third algorithm defines a search bisection ratio $\gamma > 1$, selects a fixed or estimated upper limit of maximum time $H_{upper}$, selects a lower limit of maximum time $H_{lower}$ (e.g., $H_{lower} = 3$), and establishes a constraint violation for $v_{upper}$ at infinity. It should be appreciated that the third algorithm is not limited to bisection, but may incorporate other search approaches such as a linear search (e.g., a shrinking horizon). While $v_{upper}$ is greater than a tolerance threshold, the third algorithm of the SQP 230 finds the upper limit by calling the first algorithm with the cold-start trajectory for $H_{upper}$ to determine ($x_{upper}$, $v_{upper}$), and setting the upper limit $H_{upper}$ to $\max(H_{upper}+1, \lceil \gamma H_{upper} \rceil)$. Further, while $H_{lower}$ is less than $H_{upper}$, the third algorithm searches for the shortest horizon H* by setting the minimum time:

$$H_{min} \leftarrow H_{lower} + (H_{upper} - H_{lower}) / \gamma,$$

and calling the first algorithm with a warm-start trajectory $x_{upper}$ interpolated to $H_{mid}$ to determine ($x_{mid}$, $v_{mid}$). If the velocity $v_{mid}$ is less than or equal to the tolerance threshold, then the third algorithm sets:

$$(H_{upper}, x_{upper}, v_{upper}) \leftarrow (H_{mid}, x_{mid}, v_{mid}).$$

Otherwise, the third algorithm sets the lower bound for the time horizon to an iteration of the middle horizon:

$$H_{lower} \leftarrow H_{mid}+1.$$

The third algorithm then returns the trajectory $x_{upper}$. Thus, to find the minimum time-time trajectory, the SQP 230 searches for the shortest jerk-minimized trajectory that solves all constraints. This search, as performed in the third algorithm, starts with a guess of the horizon H and then performs an exponential search for the upper bound, followed by a binary search for the shortest H by repeatedly performing the SQP of the first algorithm. The binary search warm starts each SQP with an interpolation of the trajectory of the current upper bound of H. The search ends when the upper and lower bounds of H are the same.

Figure 4:
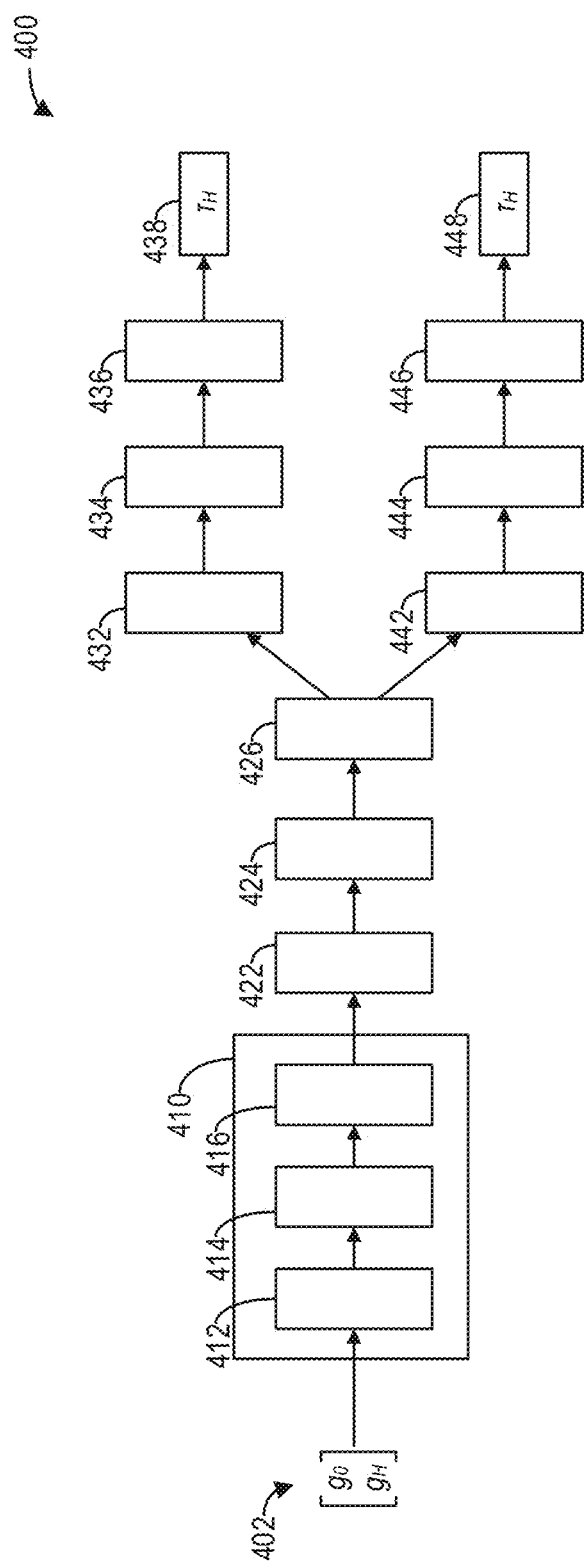
FIG. 4 shows a block diagram illustrating an example deep neural network architecture for grasp-optimized motion planning, according to an embodiment.

FIG. 4 shows a block diagram illustrating an example architecture of a deep neural network 400 configured for grasp-optimized motion planning, according to an embodiment. The deep neural network 400 may comprise the neural network 220, as an illustrative and non-limiting example. As discussed hereinabove, the input 402 may be input to the neural network to estimate trajectories for the trajectory horizon H*. It should be appreciated that the neural network architecture depicted in FIG. 4 is illustrative and non-limiting, and that the neural network 220 may be implemented with other neural network architectures without departing from the scope of the present disclosure.

Input 402 may comprise the initial frame $g_0$ and the final frame $g_H$, as depicted. The initial frame $g_0$ may comprise an exact configuration, in some examples, or in other examples may comprise initial conditions from a set. Similarly, the final frame $g_H$ may comprise an exact configuration or a set of final conditions. Therefore, the input 402 may indicate that the trajectory should begin at a single configuration and end at one of a set of configurations, that the trajectory should begin at one of a set of initial configurations and end at a single final configuration, that the trajectory should begin at one of a set of initial configurations and end at one of a set of final configurations, or that the trajectory should begin at a single initial configuration and end at a single final configuration. The initial and final frames may be concatenated for input to the deep neural network 400. The deep neural network 400 may comprise a plurality of FDE blocks, such as the FDE block 410, wherein each FDE block comprises a Fully-connected (FC) layer 412, a Dropout layer 414, and an Exponential linear unit (ELU) layer 416 as depicted with regard to the FDE block 410. In particular, the deep neural network 400 includes the FDE block 410, an FDE block 422, an FDE block 424, an FDE block 426, an FDE block 432, an FDE block 434, an FDE block 442, and an FDE block 444. As depicted, the input layer 402 is connected through four full-connected FDE blocks 410, 422, 424, and 426 to multiple output blocks. The first output block comprises the FDE block 432, the FDE block 434, and a fully-connected layer 436 that outputs to an output layer 438. The second output block comprises the FDE block 442, the FDE block 444, and a fully-connected layer 446 that outputs to an output layer 448. The outputs 438 and 448 comprise trajectories from the initial frame to the final frame for each of the time steps H supported by the deep neural network 400. For example, the first output layer 438 may comprise a trajectory with a first H equal to sixty, while the second output layer 448 may comprise a trajectory with a second H equal to seventeen, as illustrative and non-limiting examples. A separate classification neural network (e.g., neural network 210) with two fully-connected layers with one-hot encoding trained using a cross-entropy loss may be used to select which of the outputs 438 and 448 to use as the initial trajectory to warm start the SQP 230.

The neural network 400 yields both an optimal horizon length and the trajectory for that horizon. To train this neural network 400, the trajectory output layers' activation values for horizons not in the training sample are retained using a zero gradient so as to weight the contribution of the layers during backpropagation to the input layers.

As an illustrative example, to overcome the slow computation of J-GOMP, the neural network 400 is trained to approximate J-GOMP. To that end, the training dataset may be created by using J-GOMP to generate a plurality of trajectories for random pick and place points likely to be encountered at runtime (e.g., from location in a picking bin to a location in a placement bin). The neural network 400 may be trained by generating a training dataset by randomly sampling start and end pairs from the likely distribution of tasks. For example, in a warehouse pick-and-place operation, the pick frames will be constrained to a volume defined by the picking bin, and the place frames will be constrained to a volume defined by the placement or packing bin. For each random input, we generate optimized trajectories for all time horizons from $H_{max}$ to the optimal H*. Although this process generates more trajectories than necessary, generating each trajectory is efficient because the optimization for a trajectory of size H warm starts from the trajectory of size (H+1). Overall, this process is efficient and, with parallelization, can quickly generate a large training dataset. This process can also help detect whether the analysis of the maximum trajectory duration was incorrect. If all trajectories are significantly shorter than $H_{max}$, then one may reduce the number of output heads. If any trajectory exceeds $H_{max}$, then the number of output heads can be increased. In the case where the initial training data do not match the operational distribution of inputs, the result may be that the neural network produces suboptimal motions that are substantially, kinematically, and dynamically infeasible. In this case, the subsequent pass through the optimization will fix these errors, although with a longer computation time. In some examples, trajectories from operation can be continually added to the training dataset for subsequent training or refinement of the neural network.

In some examples, the neural network 400 is trained on trajectories with tighter tolerances than the trajectories computed at run time by the SQP 230. In other words, when generating trajectories for training the neural network 400, the SQP 230 may be controlled to generate trajectories with a first performance tolerance, for example such that the trajectories are within the first performance tolerance (e.g., within 0.001 millimeter of a target). During run time when the SQP 230 is used to fine-tune the trajectory from the neural network 400 or 220, the SQP 230 may update the trajectory according to a second performance tolerance that is larger than the first performance tolerance, for example such that the optimized trajectory is within the second performance tolerance (e.g., within 1 millimeter of the target). By relaxing the tolerances in this way during run time relative to the tolerances during training, the neural network 400 is better trained to output smoother and faster trajectories than what may be needed during the practical application of the neural network 400, and the SQP 230 may converge more quickly when updating the trajectory during run time relative to generating the training trajectories.

In some examples, a multipart loss function $\mathcal{L}$ may be used to train the neural network in a way that encourages matching a ground-truth trajectory while keeping the output trajectory kinematically and dynamically feasible. This loss function includes a weighted sum of mean squared error (MSE) loss on the trajectory $\mathcal{L}_T$, a boundary loss $\mathcal{L}_B$ which enforces the correct start and end positions, and a dynamics loss $\mathcal{L}_{dyn}$ that enforces the dynamic feasibility of the trajectory. The MSE loss is the mean of the sum of squared differences of the two vector arguments:

$$\mathcal{L}_{MSE}(\tilde{a}, \underline{a}) = \frac{1}{n}\sum_{i=1}^{n}(\tilde{a}_i - \underline{a}_i)^2.$$

The dynamics loss attempts to mimic the convex constraints of the SQP. Given the predicted trajectories:

$$\tilde{X} = (\tilde{x}^{H_{min}}, \ldots, \tilde{x}^{H_{max}}),$$

where $$\tilde{x}^h = (\tilde{q}, \tilde{v}, \tilde{a}, \tilde{j})_{t=0}^h,$$

and the ground-truth trajectories from dataset generation:

$$\underline{X} = (\underline{x}^{H^*}, \ldots, \underline{x}^{H_{max}}),$$

the loss functions are:

$$\mathcal{L}_T = \alpha_q \mathcal{L}_{MSE}(\tilde{q}, \underline{q}) + \alpha_v \mathcal{L}_{MSE}(\tilde{v}, \underline{v}) + \alpha_a \mathcal{L}_{MSE}(\tilde{a}, \underline{a}) + \alpha_j \mathcal{L}_{MSE}(\tilde{J}, \underline{J}),$$

$$\mathcal{L}_B = \mathcal{L}_{MSE}(\tilde{q}_0, \underline{q}_0) + \mathcal{L}_{MSE}(\tilde{q}_H, \underline{q}_H)$$

$$\mathcal{L}_{dyn} = \frac{1}{h}\sum_{t=0}^{h-1}\left\|\tilde{q}_t + t_{step}\tilde{v}_t + \frac{1}{2}t_{step}^2\tilde{a}_t + \frac{1}{6}t_{step}^3\tilde{J}_t - \tilde{q}_{t+1}\right\|^2 +$$

$$\frac{1}{h}\sum_{t=0}^{h-1}\left\|\tilde{v}_t + t_{step}\tilde{a}_t + \frac{1}{2}t_{step}^2\tilde{J}_t - \tilde{v}_{t+1}\right\|^2 + \frac{1}{h}\sum_{t=0}^{h-1}\left\|\tilde{a}_t + t_{step}\tilde{J}_t - \tilde{a}_{t+1}\right\|^2 +$$

$$\frac{1}{h}\sum_{t=0}^{h-1}\left\|\frac{1}{t_{step}}(\tilde{j}_{t+1} - \tilde{j}_t - \frac{1}{t_{step}}(\tilde{J}_{t+1} - \tilde{J}_t)\right\|^2,$$

$$\mathcal{L}^h = \alpha_T \mathcal{L}_T^h + \alpha_B \mathcal{L}_B^h + \alpha_{dyn} \mathcal{L}_{dyn}^h,$$

where values of $\alpha_q$, $\alpha_v$, $\alpha_j$, $\alpha_B$, and $\alpha_{dyn}$ are empirically chosen. This loss is combined into a single loss for the entire neural network by summing the losses of all horizons while multiplying by an indicator function for the horizons that are valid:

$$\mathcal{L} = \sum_{h=H_{min}}^{H_{max}} \mathcal{L}^h \mathbb{1}_{[H^*H_{max}]}(h).$$

As the ground-truth trajectories for horizons shorter than H* are not defined, some finite data should be present during training so that the multiplication of an indicator value of zero results in zero rather than a null value. Multiplying by an indicator function in this way results in a zero gradient for the part of the neural network that is not included in the trajectory data.

During training, the neural network may exhibit behavior of coadaptation in which it would learn either the loss $\mathcal{L}_T$ or the loss $\mathcal{L}_{dyn}$ but not both, which manifests as a test loss for one output head of the multiple-horizon neural network 400 going to small values while the other remains high. To address the problem, the dropout layers between fully-connected layers in the FDE blocks, with dropout probability $p_{drop}=0.5$ are included to reduce the loss.

Figure 5:
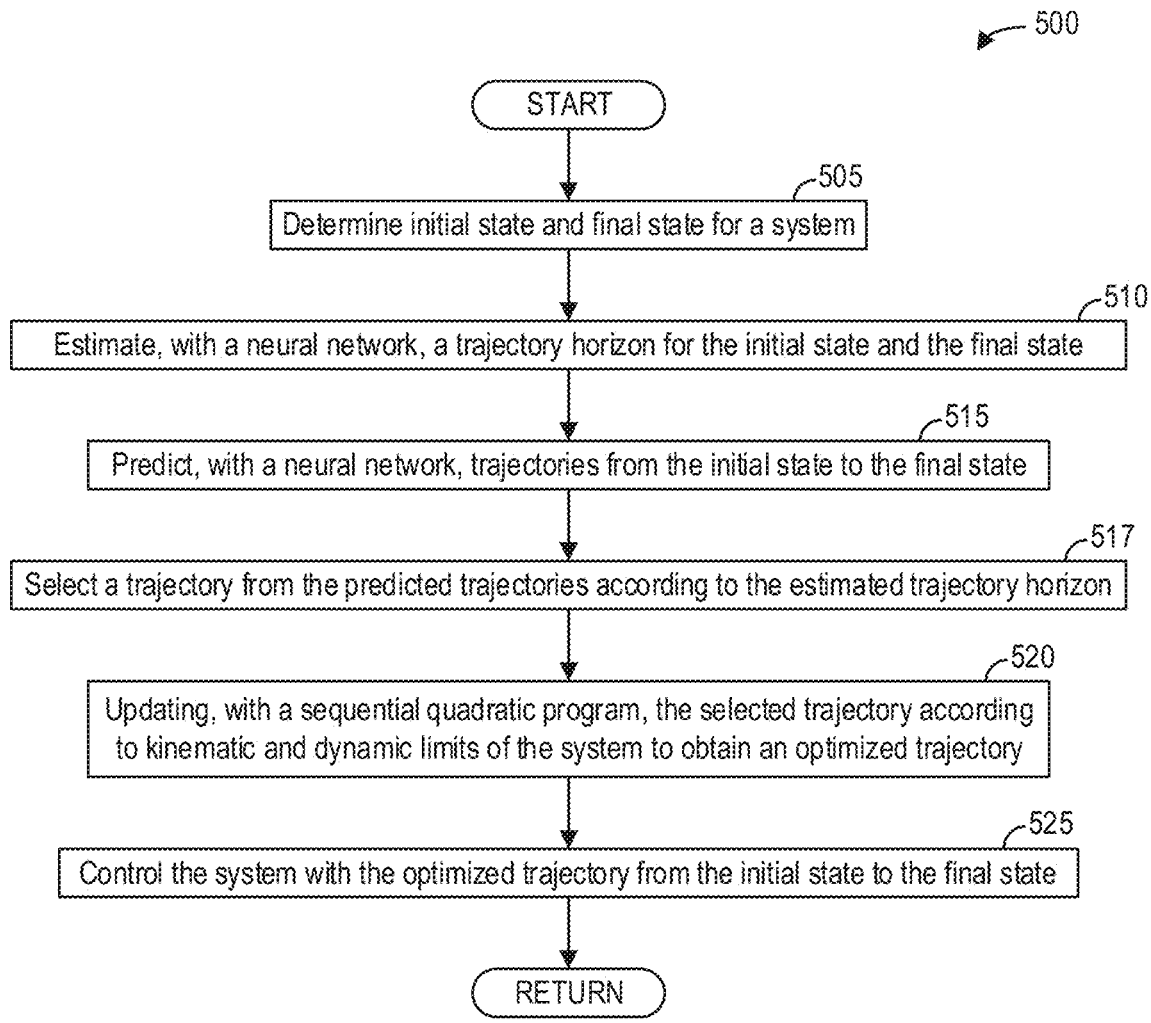
FIG. 5 shows a high-level flow chart illustrating an example method for fast motion planning, according to an embodiment.

FIG. 5 shows a high-level flow chart illustrating an example method 500 for fast motion planning, according to an embodiment. In particular, method 500 relates to rapidly estimating a trajectory for an autonomous system with a trained deep neural network, and using the estimated trajectory to warm start a sequential quadratic program for determining an optimal trajectory. In this way, the warm start allows the SQP to start from a trajectory much closer to the final trajectory and thus allows the SQP to quickly converge to the final trajectory. Further, because the SQP enforces the plurality of constraints related to the motion, the resulting trajectory is valid. Method 500 is described with regard to the systems and components of FIGS. 1-4, though it should be appreciated that the method 500 may be implemented with other systems and components without departing from the scope of the present disclosure. Method 500 may be implemented as executable instructions in non-transitory memory of the data-holding subsystem 104 of the computing system 101, for example, and may be executed by a processor of the logic subsystem 102.

Method 500 begins at 505. At 505, method 500 determines an initial state and a final state for an autonomous system. Method 500 may determine the initial state by determining a current state of the autonomous system. For example, the initial state may comprise a current configuration of the autonomous system. Method 500 may determine the final state based on a command, which may be manually or automatically generated, indicating a final configuration of the autonomous system. In examples wherein the autonomous system is adapted to grasp or otherwise engage an external object, the initial state may comprise a specification of one or more initial contact points for the object to be grasped or engaged, while the final state may comprise a specification of one or more positions to which the object is desirably moved by the autonomous system.

Figure 6:
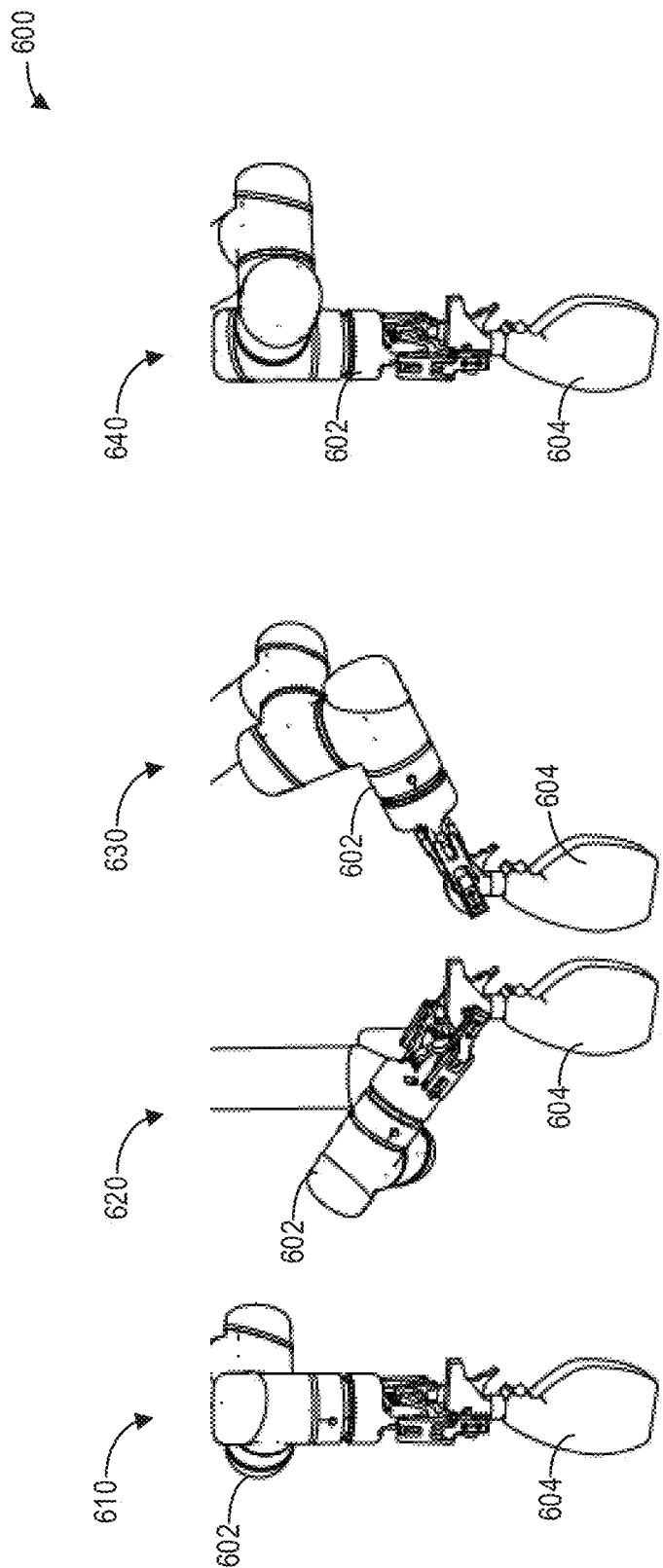
FIG. 6 shows a set of images illustrating example grasp-optimized motion planning degrees of freedom, according to an embodiment.

At 510, method 500 estimates, with a neural network, a trajectory horizon for the initial state and the final state. Estimating the trajectory horizon for the initial and final states may comprise inputting the initial and final states to a trained neural network, such as the neural network 210, to compute a forward pass of the neural network and thus obtain an estimate of the trajectory horizon. For example, method 500 may compute a single forward pass through a one-hot classification neural network to obtain an estimate $\tilde{H}^*$ of the optimal time horizon H*. Because predicting horizons shorter than H* results in an infeasible SQP, it may be beneficial to either compute multiple SQPs around the predicted horizon or to increase the horizon if the difference in the one-hot values for $\tilde{H}^*$ and $(\tilde{H}^*+1)$ is within a threshold. Due to the symmetry in grippers for the initial frame, such as in parallel and multifinger grippers of robotic arms, multiple top-down grasps may result in the same contact points. As an illustrative and non-limiting example, FIG. 6 shows a set of images illustrating example grasp-optimized motion planning degrees of freedom via different grasp configurations 600 for an example robotic arm 602 grasping an object 604, according to an embodiment. These degrees of freedom may be added to the initial and final frames, as described herein. In the first configuration 610, the robotic arm 602 grasps the object 604 with a top-down grasp or a wrist-back top grasp. As the robotic arm 602 grasps the object 604 with two contact points as depicted, the fast motion planner allows for rotation about the grasp contact points. To that end, the second configuration 620 shows the robotic arm 602 grasping the object 604 at same contact points as the first configuration 610 with a 60° rotation, while the third configuration 630 shows the robotic arm 602 grasping the object 604 at the same contact points as the first configuration 610 with a −60° rotation. Similarly, the fourth configuration 640 reverses the contact points which results in a different arm pose, which is still valid according to the grasp analysis provided herein. Thus, these degrees of freedom for rotation of the robotic arm 602 relative to the object 604 may be considered when estimating the trajectory horizons. In this setting, method 500 may estimate a trajectory horizon for all grasp configurations of the initial frame and quickly select the trajectory horizon with the lowest horizon. In the event of a tie for optimal horizons for different grasp configurations, the associated one-hot values may be used to select one of the optimal horizons.

At 515, method 500 predicts, with a neural network, trajectories from the initial state to the final state. In some examples, method 500 estimates a plurality of trajectories for the estimated trajectory horizon with the neural network 400 implemented as the neural network 220.

Then, at 517, method 500 selects a trajectory from the predicted trajectories according to the estimated trajectory horizon. For example, the neural network 210 configured for classification may be used to select a trajectory from the plurality of trajectories output by the neural network 400 according to the estimate $\tilde{H}^*$ of the optimal time horizon $H^*$. Thus, the neural networks 210 and 220 may be executed concurrently and work together to generate the trajectory from the initial state to the final state.

At 520, method 500 updates, with a sequential quadratic program, the selected trajectory according to kinematic and dynamic limits of the system to obtain an optimized trajectory. For example, method 500 uses the trajectory selected at 517 as an initial iteration of the sequential quadratic program, which enforces kinematic and dynamic limits of the system (e.g., pick and place boundaries, obstacle boundaries, jerk limits, joint limits, and so on) as discussed hereinabove with regard to FIG. 2. At 525, method 500 controls the system with the optimized trajectory from the initial state to the final state. Method 500 then returns.

Figure 7:
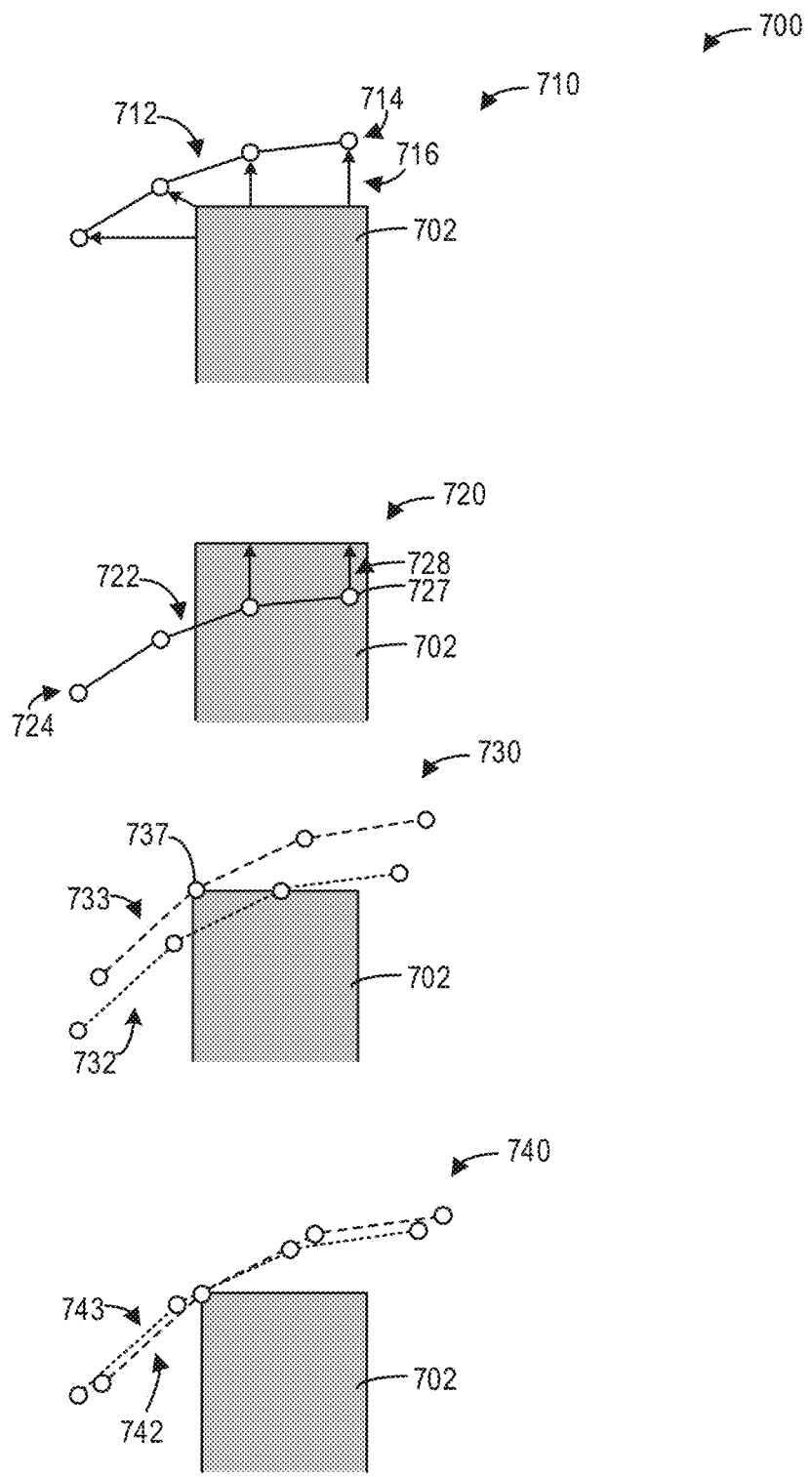
FIG. 7 shows a block diagram illustrating examples of obstacle constraint linearization, according to an embodiment.

FIG. 7 shows a block diagram illustrating examples 700 of obstacle constraint linearization to ensure trajectories do not collide with obstacles, such as the obstacle 702, according to an embodiment. The constraint linearization process keeps the trajectory away from obstacles by adding constraints based on the Jacobian of the configuration at each waypoint of the accepted trajectory $x^{(k)}$ as discussed hereinabove with regard to FIG. 2. In a first example 710, a plurality of waypoints 714 for a trajectory 712 indicate that the robot is maintained outside the obstacle, as depicted by the constraints' normal projections 716 in Euclidean space. For waypoints that are outside the obstacle 702, the constraints keep the waypoints from entering the obstacle 702. For waypoints that are inside the obstacle 720, as shown in the second example 720 depicting a plurality of waypoints 724 for a trajectory 722, the constraints 728 push the waypoints up out of the obstacle 702. For example, the waypoint 727 may be pushed out of the obstacle 702 according to the constraint 728. The third example 730 shows trajectories 732 and 733 wherein none of the waypoints of either trajectory are inside the obstacle 702. However, if the constraints are only added to the waypoints of the trajectories, the optimization may compute trajectories that collide with the obstacle 702 and produce discontinuities between trajectories with small changes to the pick or place frame. For example, as depicted, the trajectory 732 passes through the obstacle 702 while the trajectory 733, given slightly different pick and place frames relative to the trajectory 732, does not intersect with the obstacle 702. These effects may be mitigated when the boundaries of obstacles are inflated to account for them, but the discontinuities can lead to poor results when training the neural network. As discussed hereinabove, the approach provided herein adds linearized constraints to account for collision between obstacles, leading to more consistent results as shown in the fourth example 740. Therein, the trajectories 742 and 743 account for constraints along the trajectories rather than the waypoints alone, and so neither trajectory intersects the obstacle 702.

FIG. 8 shows a set of graphs 800 illustrating example computation time distributions for a plurality of random motion plans obtained with different approaches, according to an embodiment. In particular, the set of graphs 800 depict example computation time distributions for a thousand random motion plans. The first graph 810 shows a computation time distribution 812 for a full optimization process without deep-learning prediction, the second graph 820 shows a computation time distribution 822 for an optimization process that uses a deep neural network to predict an optimal time horizon for a trajectory but without warm starting the trajectory, and the third graph 830 shows a computation time distribution 832 for an optimization process that uses a deep neural network to compute a trajectory for warm starting the optimization. The first graph 810 further depicts the computation time distribution 814 corresponding to the computation time distribution 832, which emphasizes the difference in scale between the approaches. As depicted, the full optimization process without deep learning predictions may take ninety seconds or more to compute, whereas the use of deep learning only takes up to one second to compute. Further, as depicted by the graph 820, using a deep neural network to predict the optimal time horizon for a trajectory leads to improvements in compute time, but with increased failures. Using the deep neural network to compute a trajectory for warm starting the optimization, as depicted by the graph 830, further improves the compute time. The graph 830 includes a plot 832 of compute time results for the estimated trajectory horizon (e.g., H from network) and a plot 834 of compute time results for the exact trajectory horizon (e.g., H from oracle) to illustrate the effect of misprediction of trajectory length. Inexact predictions can result in a faster compute time because the resulting trajectory is suboptimal, and thus less tightly constrained, which allows the optimization to converge to a solution faster. Thus, by using deep neural networks to estimate the trajectory horizon as well as the trajectory for warm starting the SQP optimization, the compute time may be reduced by two orders of magnitude.

The median compute time without deep-learning is 25.7 seconds, while the median with deep-learning is 80 milliseconds, corresponding to an increase in compute time by three hundred times. As the neural network does not predict all trajectories exactly, the effect on the computation and resulting trajectory was evaluated by comparing to the optimal. When the neural network mis-predicts H (e.g., a median 7% error in predicted H), the predicted trajectory is typically close enough to help warm start the optimization, but the resulting trajectory is sub-optimal. The effect on compute time is that the sub-optimal trajectory can sometimes be optimized faster than the optimal trajectory. This is likely due to the sub-optimal trajectory being less constrained and thus faster to converge.

Figure 9:
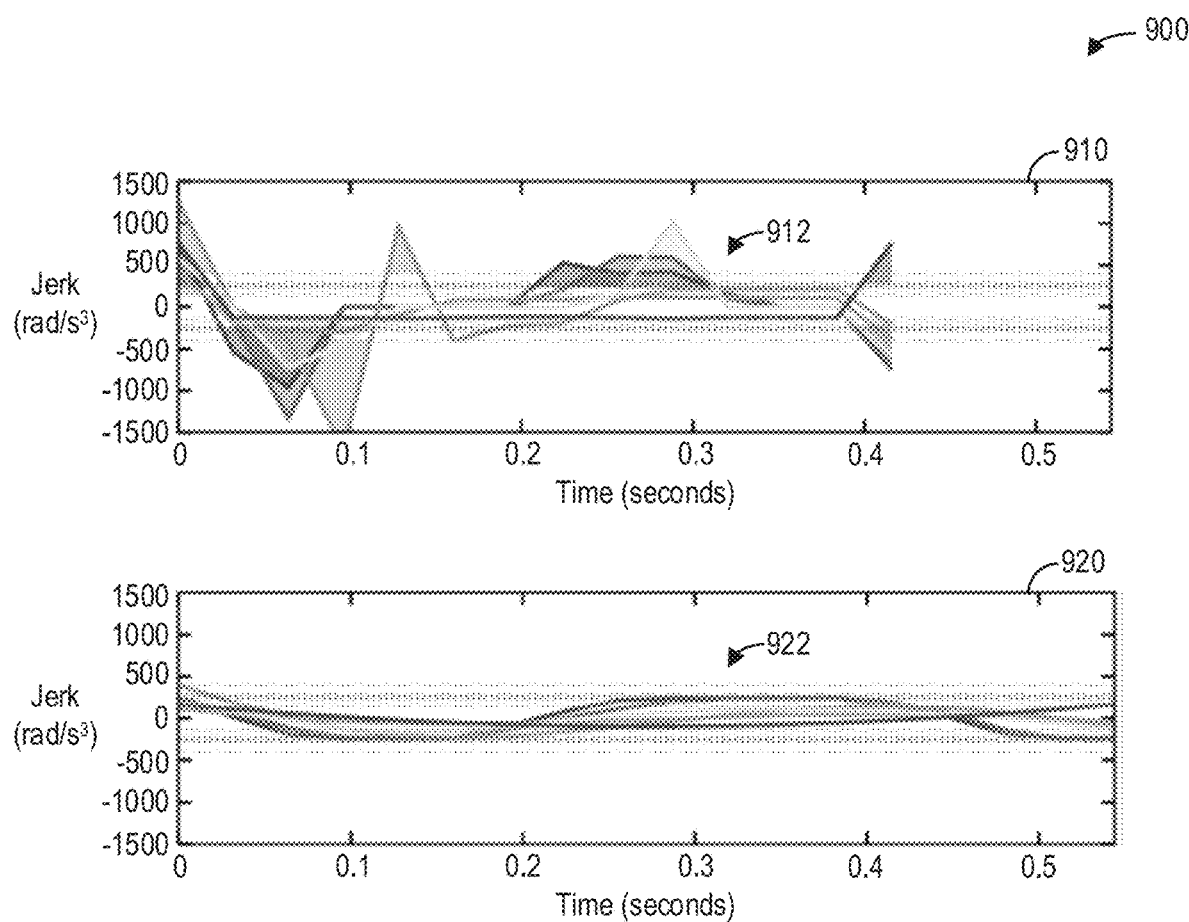
FIG. 9 shows a set of graphs illustrating an example effect of jerk limits on computed and executed motion, according to an embodiment.

FIG. 9 shows a set of graphs 900 illustrating an example effect of jerk limits on computed and executed motion, according to an embodiment. In particular, the first graph 910 shows plots 912 of the jerk of each joint in a robotic arm over time for trajectories computed without jerk limits, where jerk limits are illustrated by the horizontal dashed lines, while the second graph 920 shows plots 922 of the jerk of each joint in the robotic arm over time for trajectories computed with jerk limits. Without jerk limits, the optimization computes trajectories with large jerks throughout the trajectory, shown by the shaded regions in the plots 912. With jerk limits, each joint stays within the defined limits of the robot, as depicted by the plots 922. Although enforcing such jerk limits may typically result in additional compute time, as depicted hereinabove with regard to FIG. 8, the deep learning approach provided herein enables jerk limits to be enforced while rapidly computing trajectories at a rate suitable for real-time computation and control. That is, rather than waiting up to ninety seconds to determine an optimal motion trajectory for a robot that obeys basic kinematic and dynamic limits of the robot, the systems and methods provided herein enable optimal trajectories subject to a plurality of constraints to be obtained with a significantly shorter compute time. In other words, the systems and methods provided herein enable a speed increase for motion planning by two orders of magnitude, over three-hundred times faster, where time-optimized jerk-limited trajectories may be computed with an 80 millisecond median compute time. In embodiments wherein the motion planning techniques provided herein are implemented with robots for pick-and-place warehouse operations, the time optimization of trajectories has the potential to increase the number of picks per hour for a single robot, while the jerk limits reduce wear on the robot, leading to longer lifespans and reduced downtime. In other embodiments, the time optimization of trajectories has the potential to reduce travel time, increase construction speed, reduce durations of surgical operations, and so on.

The types and numbers of industries and areas in which embodiments may be implemented are virtually unlimited. For example, the techniques disclosed herein may be adapted to areas such as assembly, manufacturing, and inspection. Such techniques may also be adapted to areas such as painting, welding, and construction. Implementations may also be configured for digging operations and farming-related operations such as picking, pruning, watering, and so on. Embodiments may also include mail-related operations such as sorting and loading. Yet further areas for implementations may include recycling-related operations such as sorting and dividing, for example. Other embodiments for implementations may include surgical operations, autonomous vehicle control (e.g., land-based, air-based, or space-based autonomous vehicle control), and so on.

Thus, systems and methods are provided for fast computation of constrained and smooth motion trajectories. In one embodiment, a method comprises computing, with a neural network trained on trajectories generated by a non-convex optimizer, a trajectory from one or more initial states of an autonomous system to one or more final states of the autonomous system, updating, with the non-convex optimizer, the trajectory according to kinematic limits and dynamic limits of the autonomous system to obtain a final trajectory, and automatically controlling the autonomous system from an initial state of the one or more initial states to a final state of the one or more final states according to the final trajectory.

In a first example of the method, predicting the trajectory comprises computing, with the neural network, a plurality of trajectories for an input specifying the one or more initial states of the autonomous system and the one or more final states of the autonomous system, each trajectory of the plurality of trajectories with a different duration. In a second example of the method optionally including the first example, the method further comprises computing, with a second neural network, a desired duration for the input, and selecting the trajectory from the plurality of trajectories according to the desired duration. In a third example of the method optionally including one or more of the first and second examples, the neural network computes the plurality of trajectories according to a degree of freedom of the autonomous system in the one or more initial states and the one or more final states. In a fourth example of the method optionally including one or more of the first through third examples, the method further comprises updating the trajectory according to linearized constraints of one or more obstacles along the trajectory. In a fifth example of the method optionally including one or more of the first through fourth examples, the method further comprises updating the trajectory to limit jerk in the autonomous system by constraining jerk on each of the trajectory waypoints. In another example, the method further comprises updating the trajectory to minimize jerk in the autonomous system by minimizing sum-of-squared jerks over time. In a sixth example of the method optionally including one or more of the first through fifth examples, the method further comprises updating the trajectory to minimize sum-of-squared velocities and sum-of-squared accelerations. In a seventh example of the method optionally including one or more of the first through sixth examples, the non-convex optimizer generates the trajectories for training the neural network with a first performance tolerance, and the non-convex optimizer updates the trajectory with a second performance tolerance larger than the first performance tolerance. In an eighth example of the method optionally including one or more of the first through seventh examples, the non-convex optimizer comprises a sequential quadratic program, and updating the trajectory comprises iteratively updating the trajectory according to a plurality of constraints including the kinematic limits and the dynamic limits of the autonomous system, and one or more constraints relating to one or more obstacles along the trajectory. In a ninth example of the method optionally including one or more of the first through eighth examples, the autonomous system comprises a robotic arm or an autonomous vehicle configured for non-repetitive motion. In a tenth example of the method optionally including one or more of the first through ninth examples, the method further comprises determining the one or more initial states of the autonomous system based on a current configuration of the autonomous system, and determining the one or more final states of the autonomous system based on a desired configuration of the autonomous system.

In another embodiment, a method comprises computing, with a neural network, trajectories for an input specifying one or more initial states of an autonomous system and one or more final states of the autonomous system, computing, with a second neural network, a trajectory duration for the input, selecting a trajectory for the autonomous system from an initial state of the one or more initial states to a final state of the one or more final states based on the trajectories and the trajectory duration, updating the trajectory according to a plurality of constraints on the autonomous system, the plurality of constraints including jerk limits and obstacle constraints, and controlling the autonomous system with the updated trajectory from the initial state to the final state.

In a first example of the method, the method further comprises computing, with a non-convex optimizer, a plurality of trajectories for a plurality of random pairs of initial states and final states of the autonomous system, and training the neural network with the plurality of trajectories. In a second example of the method optionally including the first example, updating the trajectory according to the plurality of constraints on the autonomous system comprises updating the trajectory with the non-convex optimizer. In a third example of the method optionally including one or more of the first and second examples, the non-convex optimizer generates the plurality of trajectories for training the neural network with a first performance tolerance, and the non-convex optimizer updates the trajectory with a second performance tolerance larger than the first performance tolerance.

In yet another embodiment, a system comprises an autonomous system configured for automatic, non-repetitive motion, and a controller configured with instructions that when executed cause the controller to: compute, with a neural network trained on trajectories generated by a non-convex optimizer, a trajectory from one or more initial states of the autonomous system to one or more final states of the autonomous system; update, with the non-convex optimizer, the trajectory according to kinematic limits and dynamic limits of the autonomous system to obtain a final trajectory; and automatically control the autonomous system from an initial state of the one or more initial states to a final state of the one or more final states according to the final trajectory.

In a first example of the system, to predict the trajectory, the controller is further configured with instructions that when executed cause the controller to: compute, with the neural network, a plurality of trajectories for an input specifying the one or more initial states of the autonomous system and the one or more final states of the autonomous system, each trajectory of the plurality of trajectories with a different duration. In a second example of the system optionally including the first example, the controller is further configured with instructions that when executed cause the controller to: compute, with a second neural network, a desired duration for the input; and select the trajectory from the plurality of trajectories according to the desired duration. In a third example of the system optionally including one or more of the first and second examples, the neural network computes the plurality of trajectories according to a degree of freedom of the autonomous system in the one or more initial states and the one or more final states. In a fourth example of the system optionally including one or more of the first through third examples, the non-convex optimizer comprises a sequential quadratic program, and, to update the trajectory, the controller is further configured with instructions that when executed cause the controller to: iteratively update the trajectory according to a plurality of constraints including the kinematic limits and the dynamic limits of the autonomous system, and one or more constraints relating to one or more obstacles along the trajectory.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, and so on, that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   computing, with a neural network trained on trajectories generated by a non-convex optimizer, a trajectory from one or more initial states of an autonomous system to one or more final states of the autonomous system;
   updating, with the non-convex optimizer, the trajectory according to kinematic limits and dynamic limits of the autonomous system to obtain a final trajectory;
   automatically controlling the autonomous system from an initial state of the one or more initial states to a final state of the one or more final states according to the final trajectory; and
   updating the trajectory to minimize sum-of-squared velocities and sum-of-squared accelerations.

2. The method of claim 1, wherein computing the trajectory comprises computing, with the neural network, a plurality of trajectories for an input specifying the one or more initial states of the autonomous system and the one or more final states of the autonomous system, each trajectory of the plurality of trajectories with a different duration.

3. The method of claim 2, further comprising computing, with a second neural network, a desired duration for the input, and selecting the trajectory from the plurality of trajectories according to the desired duration.

4. The method of claim 2, wherein the neural network computes the plurality of trajectories according to a degree of freedom of the autonomous system in the one or more initial states and the one or more final states.

5. The method of claim 1, further comprising updating the trajectory according to linearized constraints of one or more obstacles along the trajectory.

6. The method of claim 1, further comprising updating the trajectory to minimize jerk in the autonomous system by minimizing sum-of-squared jerks over time.

7. The method of claim 1, wherein the non-convex optimizer generates the trajectories for training the neural network with a first performance tolerance, and the non-convex optimizer updates the trajectory with a second performance tolerance larger than the first performance tolerance.

8. The method of claim 1, wherein the non-convex optimizer comprises a sequential quadratic program, and wherein updating the trajectory comprises iteratively updating the trajectory according to a plurality of constraints including the kinematic limits and the dynamic limits of the autonomous system, and one or more constraints relating to one or more obstacles along the trajectory.

9. The method of claim 1, wherein the autonomous system comprises a robotic arm or an autonomous vehicle configured for non-repetitive motion.

10. The method of claim 1, further comprising determining the one or more initial states of the autonomous system based on a current configuration of the autonomous system, and determining the one or more final states of the autonomous system based on a desired configuration of the autonomous system.

11. A system, comprising:
    An autonomous system configured for automatic, non-repetitive motion; and
    a controller configured with instructions that when executed cause the controller to:
    compute, with a neural network trained on trajectories generated by a nonconvex optimizer, a trajectory from one or more initial states of the autonomous system to one or more final states of the autonomous system;
    update, with the non-convex optimizer, the trajectory according to kinematic limits and dynamic limits of the autonomous system to obtain a final trajectory;
    automatically control the autonomous system from an initial state of the one or more initial states to a final state of the one or more final states according to the final trajectory; and
    update the trajectory to minimize sum-of-squared velocities and sum-of-squared accelerations.

12. The system of claim 11, wherein, to compute the trajectory, the controller is further configured with instructions that when executed cause the controller to:
    compute, with the neural network, a plurality of trajectories for an input specifying the one or more initial states of the autonomous system and the one or more final states of the autonomous system, each trajectory of the plurality of trajectories with a different duration.

13. The system of claim 12, wherein the controller is further configured with instructions that when executed cause the controller to:
    compute, with a second neural network, a desired duration for the input; and
    select the trajectory from the plurality of trajectories according to the desired duration.

14. The system of claim 12, wherein the neural network computes the plurality of trajectories according to a degree of freedom of the autonomous system in the one or more initial states and the one or more final states.

15. The system of claim 11, wherein the non-convex optimizer comprises a sequential quadratic program, and wherein, to update the trajectory, the controller is further configured with instructions that when executed cause the controller to:
    iteratively update the trajectory according to a plurality of constraints including the kinematic limits and the dynamic limits of the autonomous system, and one or more constraints relating to one or more obstacles along the trajectory.

16. The method of claim 1, wherein computing the trajectory comprises computing, with the neural network, a plurality of trajectories for an input specifying the one or more initial states of the autonomous system and the one or more final states of the autonomous system, each trajectory of the plurality of trajectories with a different duration.

17. The method of claim 16, further comprising computing, with a second neural network, a desired duration for the input, and selecting the trajectory from the plurality of trajectories according to the desired duration.

18. The method of claim 16, wherein the neural network computes the plurality of trajectories according to a degree of freedom of the autonomous system in the one or more initial states and the one or more final states.

* * * * *